United States Patent [19]

Hansen

[11] Patent Number: 5,713,462

[45] Date of Patent: Feb. 3, 1998

[54] COMPACT DISK PACKAGING INSERT AND PACKAGE

[75] Inventor: Jonathan C. Hansen, Grand Rapids, Mich.

[73] Assignee: Display Pack, Inc., Grand Rapids, Mich.

[21] Appl. No.: 576,473

[22] Filed: Dec. 21, 1995

[51] Int. Cl.[6] .................................................. B65D 85/30
[52] U.S. Cl. ........................ 206/308; 206/312; 206/493
[58] Field of Search ............................ 206/307, 308.1, 206/307.1, 308, 312, 309, 313, 303–345, 445–485, 486, 493; 211/40

[56] References Cited

U.S. PATENT DOCUMENTS

| 1,303,299 | 5/1919 | Hahl | 206/309 |
|---|---|---|---|
| 3,423,005 | 1/1969 | Leibson et al. | 206/205 |
| 3,543,668 | 12/1970 | Vlock | 206/455 |
| 3,549,225 | 12/1970 | Scaccia | 206/312 |
| 4,181,220 | 1/1980 | Zicko | 206/486 |
| 5,011,072 | 4/1991 | Ludwig | 206/455 |
| 5,188,230 | 2/1993 | O'Brien et al. | |
| 5,248,032 | 9/1993 | Sheu et al. | |
| 5,407,067 | 4/1995 | Cotter et al. | 206/312 |
| 5,469,965 | 11/1995 | Stearns | 206/387.1 |
| 5,485,918 | 1/1996 | Lasenby et al. | 206/485 |

*Primary Examiner*—Paul T. Sewell
*Assistant Examiner*—Luan K. Bui
*Attorney, Agent, or Firm*—Warner, Norcross & Judd LLP

[57] ABSTRACT

A packaging system for holding CDs in overlapping relationship to provide a compact and attractive retail display. The system includes a windowed box and an insert for holding the CDs for display through the window. The insert is folded from a one-piece sheet to form a tent defining a plurality of parallel V-shaped slots in which CDs can be placed.

25 Claims, 2 Drawing Sheets ns. The current material is
COMPACT DISK PACKAGING INSERT AND PACKAGE

BACKGROUND OF THE INVENTION

The present invention relates to packaging inserts, and more particularly to inserts for packaging compact discs ("CDs").

Increasingly, CDs are sold at the retail level in multiple CD volumes or in multiple CD sets. Consequently, there is a need for packaging that can contain multiple CDs. Ideally, CD packaging displays CDs in a manner that attracts consumers, while also satisfying manufacturers' cost and quality-control concerns. The cost concerns include minimizing packaging-material costs and designing CD packages that allow simple packaging procedures. One quality-control concern is the possibility that the sensitive area (i.e., the pressed area or media surface) of a CD will be contaminated when the CD is inserted into its packaging. For example, the sensitive area of a CD must be kept free of finger prints, which might interfere with the ability of a machine to read the information contained in the CD. Further, visual information is often placed on the resin, or top, surface of a CD; any finger prints or scratches on this surface could annoy a consumer, or cause a consumer to question the quality of the CD.

Existing multiple-CD packaging is not fully satisfactory. One approach includes packaging each CD in a conventional CD case and then wrapping multiple cases together in an overwrap. This technique is expensive, wasteful of packaging material, and prohibits a consumer from viewing any of the packaged CDs beyond the top one in the stack.

Another approach is to package CDs in a strip of clear plastic packaging having a plurality of edge-to-edge CD pockets along its length. Although the individual CDs are visible through the individual pockets, the technique requires a relatively large amount of plastic packaging and sophisticated packaging/sealing technology. The packages are not compact—some extend several feet in length, depending on the number of CDs.

SUMMARY OF THE INVENTION

The aforementioned problems are overcome in the present invention wherein a one-piece folded insert supports discs in a compact configuration. More specifically, the insert is a sheet folded to create at least two panels: a first and a second panel, which form the sides of a tent. Preferably, a third panel forms a tent floor to support the side panels of the tent. The tent has a crest, which defines at least one slot to receive a disc. Preferably, the slot is V-shaped, having a juncture centered on the crest of the tent. The angle of the V-shaped slot can be varied to display the surface of the disc held by the slot at a desired angle. If the crest of the tent defines a plurality of slots to hold multiple CDs, preferably these slots are a series of parallel V-shaped slots centered on the crest.

Preferably, when used to support CDs, the junctures of the V-shaped slots are cut in an arc or back-cut so that a portion of the crest extends through the central holes of the CDs that have been inserted in the V-shaped slots, thus locking the CDs in place. Further preferably, the branches of the V-shaped slots have a widened portion so that the sensitive or pressed area of the CDs will not touch the insert while the CDs are held in the slots.

In another embodiment of the present invention, the device for holding CDs contains two tent shapes each incorporating a series of parallel slots to accommodate larger numbers of CDs.

In yet another embodiment of the invention, the packaging includes both the described insert and a box into which the insert and CDs are placed. The box defines a window aligned with the CDs in the insert to effectively display the CDs for retail sale.

The present invention provides a cost-effective CD holder that can be inserted into packaging to hold CDs without contaminating or damaging the pressed area of the CDs. Further, the present invention displays CDs in an attractive manner to retail consumers.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
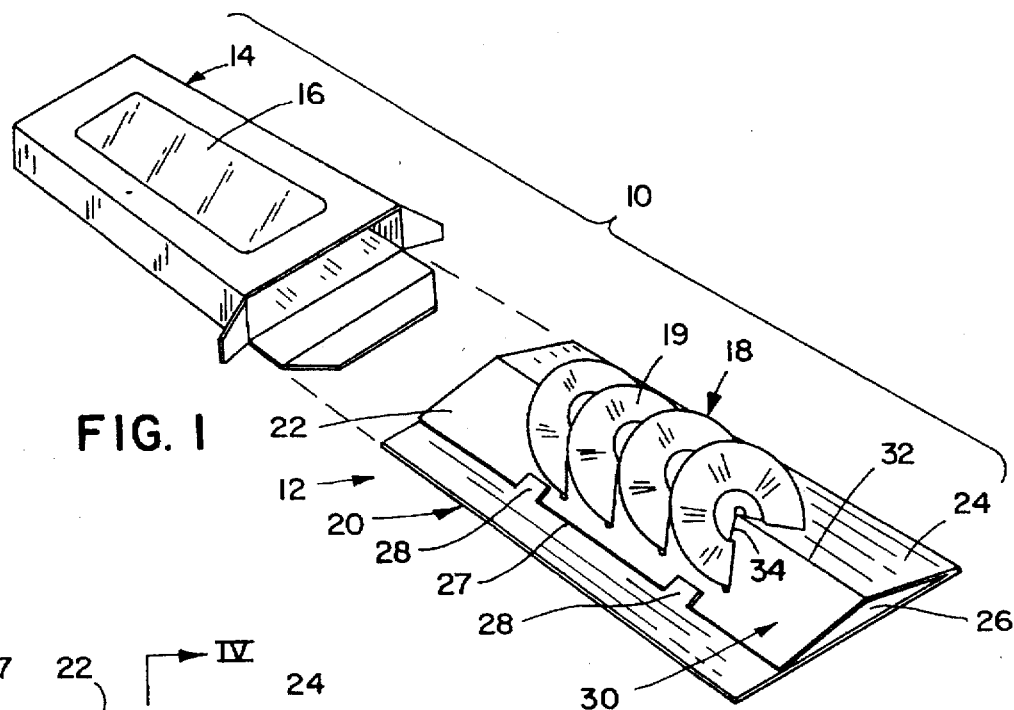
FIG. 1 is a perspective exploded view of the packaging of the present invention including an insert holding four CDs and a box.

A compact disc ("CD") packaging system 10 is illustrated in FIG. 1 and generally designated 10. The system includes an insert 12 for supporting multiple CDs and a box 14 into which the insert is placed. FIG. 1 shows insert 12 withdrawn from box 14. Box 14 has a clear window 16 to display its packaged contents, a practice that is well known to those skilled in the packaging art. Insert 12 is shown holding CDs 18, which have a sensitive or pressed area 19.

The insert 12 is referred to as "tent-locking" because it folds to form a tent and locks within itself to maintain the tent shape. The insert is made of a one-piece sheet 20, which has been folded to form three panels: first panel 22, second panel 24, and third panel 26. Sheet 20 is made of any material capable of being folded. The current material is SBS stock paperboard (0.024 inch thickness).

The free edge 27 of first panel 22 is held between flaps 28 and third panel 26. Flaps 28 are cut in and lifted from sheet 20 in third panel 26. First panel 22 and second panel 24 together form a tent 30 having a crest 32. Tent 30 defines a plurality of parallel V-shaped slots 34 in which CDs 18 are inserted.

Figure 2:
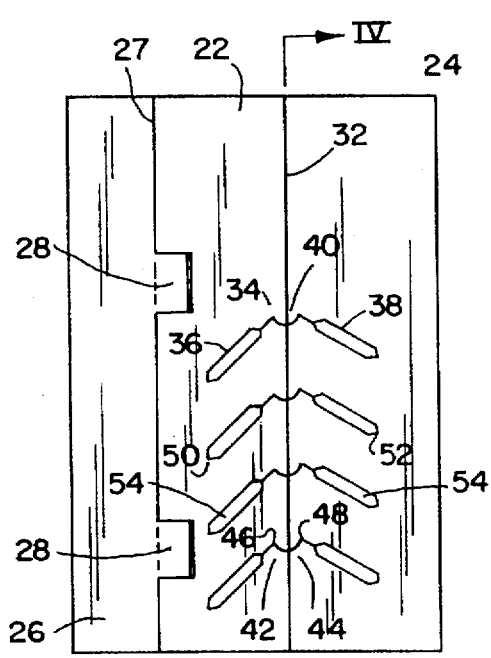
FIG. 2 is a top plan view of the insert.
Figure 3:
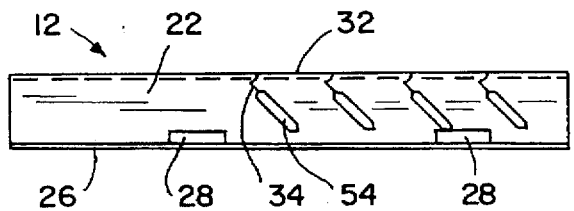
FIG. 3 is a side elevation of the insert.
Figure 4:
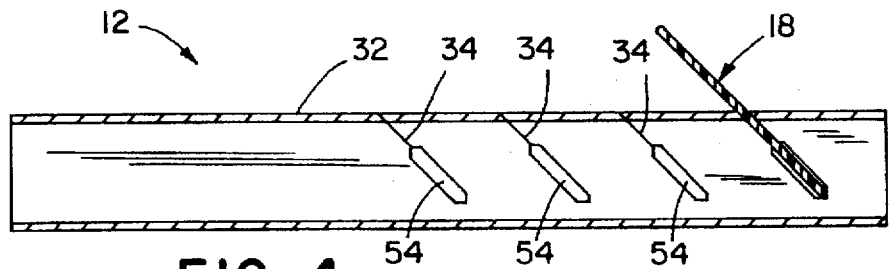
FIG. 4 is a sectional view taken along line IV—IV in FIG. 2 with one CD supported in the insert.

FIG. 2 shows tent-locking insert 12 from a top plan view without any CDs in place. Each of V-shaped slots 34 has first branch 36 that is located in first panel 22, second branch 38 that is located in second panel 24, and juncture 40 that is centered on crest 32. Preferably, both first branch 36 and second branch 38 form acute angles relative to crest 32. The angled position of V-shaped slots 34 allows CDs 18 to be placed within V-shaped slots 34 so that when tent-locking insert 12 is placed within box 14, the surfaces of CDs 18 can be seen through clear window 16. The angle of V-shaped slots can be chosen to suit the CD-display effect that a packager desires.

Juncture 40 is preferably cut to form back-cut 42, which extends within the acute angle formed between first branch 36 and crest 32, and to form back-cut 44, which extends within the acute angle formed between second branch 38 and crest 32. More preferably, juncture 40 will have a distance between first point 46, where back-cut 42 intersects first branch 36, and second point 48, where back-cut 44 intersects second branch 38, that is less than the diameter of the central hole of a CD. This diameter is well known in the packaging art because CDs have standardized dimensions.

When first panel 22 and second panel 24 are folded to create the tent shape of crest 30, juncture 40 extends through the central hole of a CD placed in one of V-shaped slots 34. This extension of juncture 40 through the central hole of a CD acts to lock the CD in place, that is, to hold the CD within one of V-shaped slots 34. To unlock the CD, panel 22 and panel 24 are flattened to withdraw juncture 40 from the central hole of the CD.

FIG. 2 also shows third point 50, which is located where first branch 36 terminates furthest from crest 32, and fourth point 52, which is located where second branch 38 terminates furthest from crest 32. Preferably, the distance from first point 46 to third point 50, and the distance from second point 48 to fourth point 52, are both greater than the difference between the outer diameter of a CD and the diameter of the central hole of a CD. This latter difference is well known in the packaging art because CDs have standardized dimensions. More preferably, the distance from first point 46 to third point 50, and the distance from second point 48 to fourth point 52, both are about one-eighth inch (⅛") longer than the difference between the outer diameter of a CD and the diameter of the central hole of a CD. A CD placed within one of V-shaped slots 34 rests against the ends of first branch 36 and second branch 38, and thus can be easily positioned so that juncture 40 will extend through the central hole of the CD when first panel 22 and second panel 24 are folded to form the tent 30.

FIG. 2 also shows widened portions 54, which extend from third point 50 along first branch 36 and from fourth point 52 along second branch 38, toward juncture 40. Widened portions 54 extend toward juncture 40 along first branch 36 and second branch 38 for a distance at least as long as the width of the sensitive or pressed area 19 of a CD, preferably for a distance about one-fourth inch (¼") longer than the distance measured from the outer diameter of a CD to the inner edge of the technical identification band of a CD. Widened portions 54 are wider than the thickness of a CD. Again, the dimensions of CDs are well known to those skilled in the packaging art because these dimensions are standardized. Preferably, widened portions 54 are about one-fourth inch (¼") in width. Sheet 20 does not touch the pressed area of a CD placed within one of V-shaped slots 34 once sheet 20 has been folded to form the tent shape of crest 30. This will help assure that the pressed or sensitive area 19 of CDs 18 held by tent-locking insert 12 are not scratched or contaminated.

Figure 5:
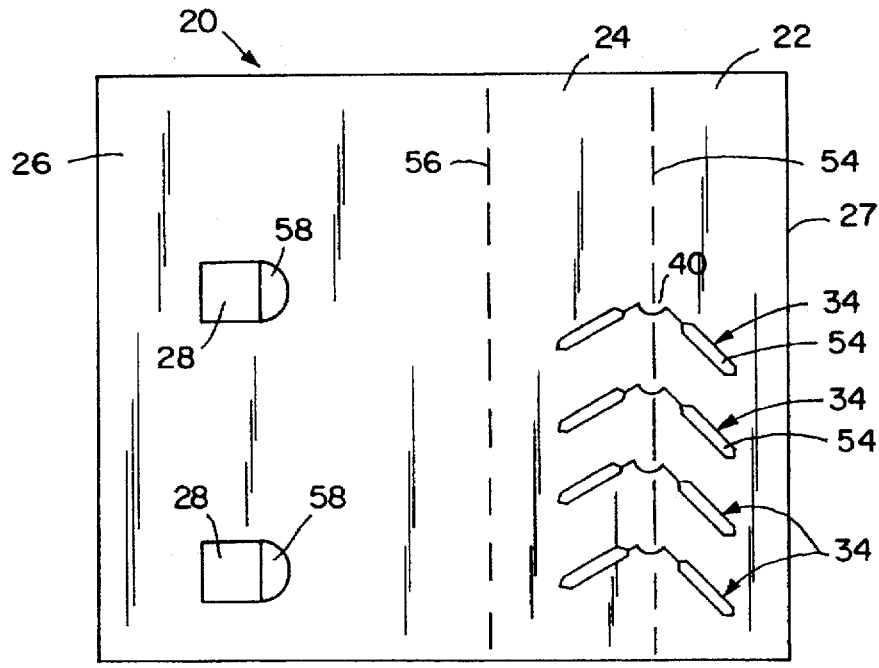
FIG. 5 is a top plan view of an insert blank before it is folded.

FIG. 5 shows sheet or blank 20 in a flat position prior to any folding. Sheet 20 is die-cut from the above described material to form the blank as illustrated in FIG. 2. Preferably, in order to make subsequent folding accurate and easy, sheet 20 is scored along first line 54 and second line 56; that is, sheet 20 is impressed or cut along first line 54 and second line 56 to a depth that only partially penetrates the thickness of sheet 20. V-shaped slots 34 are cut into sheet 20, with juncture 40 of V-shaped slots 34 centered on first line 54. Preferably, flaps 28 are cut into sheet 20, located in third panel 26 at a position that will set the desired height of crest 32 when first panel 22 is inserted between third panel 26 and flaps 28. Further, each one of flaps 28 will preferably have a semi-circular portion 58 cut away, so that a packager can easily insert a finger to lift each flap prior to inserting first panel 22 between flaps 28 and third panel 26.

Use and Operation

Prior to insertion of the CDs, sheet 20 is folded along line 56 only so that first and second panels 22 and 24 lie flat against third panel 26. CDs 18 are inserted into V-shaped slots 34 while first and second panels 22 and 24 are flat and coplanar. After the CDs are inserted, sheet 20 is folded along line 54 to "tent" the first and second panels. The free edge 27 of the first panel is slid under the tabs 28 to retain the first and second panels in the tented condition.

As the first and second panels are tented, the junctures 40 associated with each slot 34 raises and extends into the central hole of the associated CD. These junctures therefore prevent the CDs from being withdrawn from the slots until the insert is untented and reflattened. Such retention improves the ease with which the "loaded" insert can be handled in inserting it into the box 14. The CDs do not inadvertently slip or dislodge as the insert is subsequently handled.

The widened portions 54 of the slots 34 ensure that the insert does not touch the sensitive or pressed area 19 of the CDs 18 in the tented insert. Such construction greatly reduces the likelihood that the media surface will be damaged during packaging and subsequent handling and shipping.

Alternative Double-Row Embodiment

Figure 6:
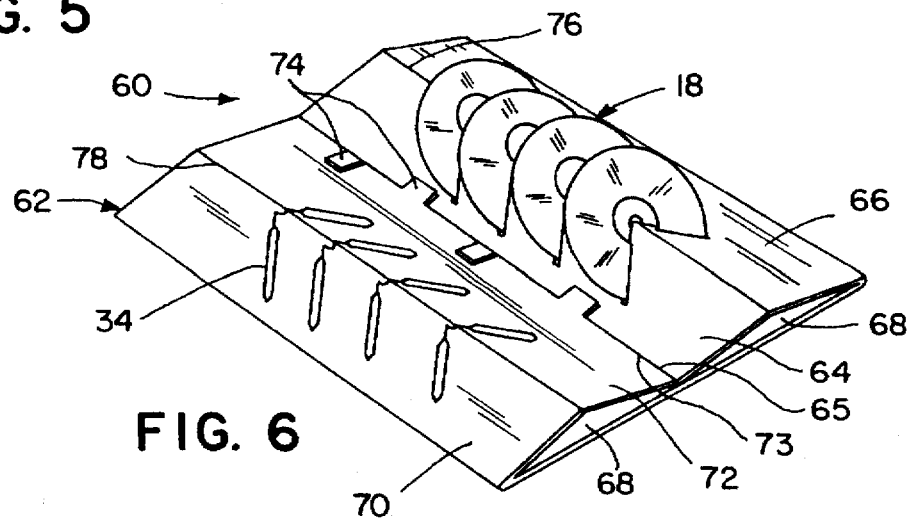
FIG. 6 is a perspective view of a double-sided insert of the present invention, shown holding four CDs.

FIG. 6 shows another embodiment of the present invention accommodating two rows and multiple inserts. The alternative insert 60 is made of sheet 62, which has been folded to form five panels: first panel 64, second panel 66, third panel 68, fourth panel 70, and fifth panel 72. First panel 64 and fifth panel 72 are retained in position by the third panel 68. Specifically, free edge 65 of first panel 64 and free edge 73 of fifth panel 72 are inserted between flaps 74 and third panel 68. Flaps 74 are essentially the same as flaps 28, except that in this embodiment, flaps 74 preferably alternate in direction, so that flaps 74 also alternate in their function of retaining first panel 64 to third panel 68 and retaining fifth panel 72 to third panel 68. In this embodiment, then, sheet 62 forms a tent shape having crest 76 and a tent shape having crest 78 located side-by-side. Crest 76 and crest 78 contain a plurality of V-shaped slots 34 in which CDs 18 are inserted. Besides the number of tent shapes, tent-locking insert 60, which has two side-by-side tent shapes, is otherwise similar to and has the same preferred embodiments as tent-locking insert 12, which has only one tent shape. The box (not shown) with which the insert 60 is used includes either one large window or two separate windows to display the two rows of CDs.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. A device for holding a disc having a center hole comprising:
    a sheet folded to form a tent having first and second panels, said first and second panels meeting at a crest of said tent, said tent defining a slot opening through said crest, said slot defining a first branch located in said first panel and a second branch located in said second panel, said first and second branches each forming a non-perpendicular angle relative to said crest, said slots dimensioned to receive the disc with the center hole aligned with said crest, said first and second branches meeting at a juncture at said crest, said juncture having a size sufficient to extend through the center hole in the disc to retain the disc within said slot; and retention means for supporting said first and second panels as said tent.

2. The device of claim 1 wherein:

said tent defines a plurality of said slots opening through said crest, said slots being parallel to one another; and said tent includes a plurality of said junctions each associated with one of said slots.

3. The device of claim 1 wherein said sheet is folded to define a third panel, said third panel forming a floor of said tent, said retention means being integral with said third panel.

4. The device of claim 3 wherein the retention means comprises a flap extending from said third panel, said first panel fitting between said third panel and said flap.

5. The device of claim 1 wherein said first branch forms a first acute angle relative to said crest, and said second branch forms a second acute angle relative to said crest.

6. The device of claim 1 wherein said retention means maintains said first panel in contact with said third panel.

7. The device of claim 1 wherein said juncture is adapted to extend fully across said slot, whereby said crest is essentially uninterrupted.

8. A device for holding a disc having a central hole comprising:

a sheet folded to form a tent having first and second panels, said first and second panels meeting at a crest of said tent;

a slot defined by said tent and opening through said crest, said slot defining a first branch located in said first panel and a second branch located in said second panel, said first branch forming a first acute angle relative to said crest and said second branch forming a second acute angle relative to said crest;

a juncture formed by a first back-cut extending from said first branch to said crest, said first back-cut positioned within said first acute angle, and a second back-cut extending form said second branch to said crest, said second back-cut positioned within said second acute angle, said juncture having a size sufficient to extend through the hole of the disc placed into said slot; and retention means for supporting said first and second panels.

9. The device of claim 8 wherein the disc has a given thickness and a sensitive area of a given radial extent, and wherein each said first and second branches have a widened portion extending at least as long as the radial extent of the sensitive area of the disc, said widened portion having a width greater than the thickness of the disc, whereby the sensitive area of the disc does not touch the device.

10. A device for holding discs comprising:

a sheet folded to form first, second, third, fourth, and fifth panels;

said first, second, and third panels forming a triangularly shaped first tent having a first crest, said first tent defining a first plurality of parallel slots opening through said first crest, each slot of said first plurality defining a first branch, a second branch, and a first juncture, said first branch located in said first panel, said second branch located in said second panel, and said first juncture centered at said first crest;

said third, fourth, and fifth panels forming a triangularly shaped second tent having a second crest, said second tent defining a second plurality of parallel slots opening through said second crest, each slot of said second plurality defining a third branch, a fourth branch, and a second juncture, said third branch located in said fourth panel, said fourth branch located in said fifth panel, and said second juncture centered at said second crest;

said third panel forming a floor of said first and second tents; and retention means for supporting said first, second, fourth, and fifth panels above said third panel as said triangularly shaped first and second tents.

11. The device of claim 10 wherein said first branch forms a first acute angle relative to said first crest, said second branch forms a second acute angle relative to said first crest, said third branch forms a third acute angle relative to said second crest, and said fourth branch forms a fourth acute angle relative to said second crest.

12. The device of claim 10 wherein said retention means maintains said third panel in contact with said first and fifth panels.

13. The device of claim 10 wherein said sheet is paperboard.

14. A device for holding discs comprising:

a sheet folded to form first, second, third, fourth, and fifth panels;

said first and second panels forming a first tent having a first crest, said first tent defining a first plurality of parallel slots opening through said first crest, each slot of said first plurality defining a first branch, a second branch, and a first juncture, said first branch located in said first panel, said second branch located in said second panel, and said first juncture centered at said first crest;

said fourth and fifth panels forming a second tent having a second crest, said second tent defining a second plurality of parallel slots opening through said second crest, each slot of said second plurality defining a third branch, a fourth branch, and a second juncture, said third branch located in said fourth panel, said fourth branch located in said fifth panel, and said second juncture centered at said second crest; and retention means for supporting said first, second, fourth, and fifth panels above said third panel, wherein the retention means comprises positioning said first panel between said third panel and a first flap lifted from said third panel, and positioning said fifth panel between said third panel and a second flap lifted from said third panel.

15. A device for holding a plurality of discs each of which has a central hole comprising:

a sheet folded to form first, second, third, fourth, and fifth panels;

said first and second panels forming a first tent having a first crest, said first tent defining a first plurality of parallel slots opening through said first crest, each slot of said first plurality defining a first branch located in said first panel and a second branch located in said second panel;

each said first branch forming a first acute angle relative to said first crest;

each said second branch forming a second acute angle relative to said first crest, said fourth and fifth panels forming a second tent having a second crest, said second tent defining a second plurality of parallel slots opening through said second crest, each slot of said second plurality defining a third branch located in said fourth panel and a fourth branch located in said fifth panel;

each said third branch forming a third acute angle relative to said second crest;

each said fourth branch forming a fourth acute angle relative to said second crest;

a plurality of first junctures each formed by a first back-cut extending from each said first branch to said first crest, said first back-cut positioned within said corresponding first acute angle, and a second back-cut extending from each said second branch to said first crest, said second back-cut positioned within said corresponding second acute angle;

a plurality of second junctures each formed by a third back-cut extending from each said third branch to said second crest, said third back-cut positioned within said corresponding third acute angle, and a fourth back-cut extending from each said fourth branch to said second crest, said fourth back-cut positioned within said corresponding fourth acute angle;

each said first juncture having a size sufficient to extend through the hole of one disc placed within one of said first plurality of slots, and each said second junctures having a size sufficient to extend through the hole of one disc placed within one of said second plurality of slots; and retention means for supporting said first, second, fourth, and fifth panels above said third panel.

16. The device of claim 15 wherein each of the plurality of discs has a given thickness and a sensitive area of a given radial extent, and wherein each of said first, second, third, and fourth branches has a widened portion extending at least as long as the radial extent of the sensitive area of each disc, said widened portion having a width greater than the thickness of each disc, whereby the sensitive area of each disc does not touch the device.

17. A packaging system for supporting a disc, said system comprising a single piece folded to create first, second, and third panels, said second panel positioned between said first and third panels, said first and second panels tented about a crest above said third panel to form a triangular shape, said single piece including retainer means for retaining said first and second panels in the tented condition above said third panel, said single piece defining a slot opening through said crest for receiving and supporting the disc, said slot opening forming a non-perpendicular angle relative to said crest.

18. The packaging system of claim 17 wherein said single piece defines a plurality of generally parallel slots opening through said crest for receiving and supporting a plurality of discs generally parallel to one another.

19. The packaging system of claim 17 further comprising a box housing said single piece and the supported disc.

20. A packaging system for supporting a disc having a central hole, said packaging system comprising a single piece folded to create first, second, and third panels, said second panel positioned between said first and third panels, said first and second panels tented about a crest above said third panel, said single piece including retainer means for retaining said first and second panels in the tented condition above said third panel, said single piece defining a slot opening through said crest for receiving and supporting the disc, said slot opening forming a non-perpendicular angle relative to said crest, said single piece including a juncture portion at said crest and adjacent to said slot, said juncture portion having a size sufficient to extend through the hole in the disc to retain the disc placed in said slot.

21. The packaging system of claim 20 wherein said single piece defines a plurality of generally parallel slots opening through said crest for receiving and supporting a plurality of discs generally parallel to one another, said single piece including a plurality of juncture portions at said crest, each of said juncture portions being adjacent to one of said plurality of slots, each of said juncture portions having a size sufficient to extend through the central hole in one of the plurality of discs to retain the disc placed in one of said slots.

22. The packaging system of claim 20 further comprising a box housing said single piece and the disc placed in said slot.

23. The device of claim 20 wherein said juncture portion is adapted to extend fully across said slot, whereby said crest is essentially uninterrupted.

24. A device for holding a disc having a central hole comprising:

a sheet folded to form a tent having first and second panels, said first and second panels meeting at a crest of said tent;

a slot defined by said tent and opening through said crest, said slot defining a first branch located in said first panel and a second branch located in said second panel, said first branch forming a first non-perpendicular angle relative to said crest and said second branch forming a second non-perpendicular angle relative to said crest;

a juncture formed by a first back-cut extending from said first branch to said crest and a second back-cut extending from said second branch to said crest, said juncture having a size sufficient to extend through the hole of the disc placed into said slot to retain the disc in said slot; and retention means for supporting said first and second panels.

25. The device of claim 24 wherein the disc has a given thickness and a sensitive area of a given radial extent, and wherein each said first and second branches have a widened portion extending at least as long as the radial extent of the sensitive area of the disc, said widened portion having a width greater than the thickness of the disc, whereby the sensitive area of the disc does not touch the device.

* * * * *

UNITED STATES PATENT AND TRADEMARK OFFICE
CERTIFICATE OF CORRECTION

PATENT NO. : 5,713,462
DATED      : February 3, 1998
INVENTOR(S): Jonathan C. Hansen It is certified that error appears in the above-indentified patent and that said Letters Patent is hereby corrected as shown below:

Column 5, line 48:

"form" should be --from--

Signed and Sealed this

Twelfth Day of May, 1998

Attest:

BRUCE LEHMAN

*Attesting Officer*      *Commissioner of Patents and Trademarks*